(12) United States Patent
Johns et al.

(10) Patent No.: US 6,920,721 B2
(45) Date of Patent: Jul. 26, 2005

(54) BUILDING SYSTEM

(75) Inventors: Evor F. Johns, Goshen, IN (US);
James E. Rose, Momence, IL (US);
Skyler J. Epperson, Haubstadt, IN (US); Marc H. Pulver, Albion, IN (US); Kenneth A. Long, Elkhart, IN (US)

(73) Assignee: Adv-Tech Building Systems, LLC, Goshen, IN (US)

(*) Notice: Subject to any disclaimer, the term of this patent is extended or adjusted under 35 U.S.C. 154(b) by 62 days.

(21) Appl. No.: 10/455,081

(22) Filed: Jun. 5, 2003

(65) Prior Publication Data

US 2004/0025449 A1 Feb. 12, 2004

Related U.S. Application Data

(60) Provisional application No. 60/386,303, filed on Jun. 5, 2002.

(51) Int. Cl.$^7$ .............................. E04H 6/00; E04B 1/18; E04B 5/10; E04B 5/18; E04C 3/02
(52) U.S. Cl. ..................... 52/79.1; 52/79.12; 52/143; 52/633; 52/653.1; 52/693; 280/785; 280/789; 280/795; 280/799; 296/181.1; 296/182.1; 296/204
(58) Field of Search ............... 52/79.1, 143, 122.1, 52/124.2, 125.2, 23, 79.12, 79.9, 64, 263, 299, 272, 474, 479, 481.1, 633, 650.1, 650.3, 653.1, 654.1, 656.1, 690, 693, 274; 296/181.1, 182.1, 204; 280/785, 789, 795–799

(56) References Cited

U.S. PATENT DOCUMENTS

| 2,731,680 | A | * | 1/1956 | Bolt ............................. 52/64 |
| 2,982,580 | A | * | 5/1961 | Lewis ......................... 52/143 |
| 3,042,423 | A |   | 7/1962 | Bock |
| 3,492,767 | A | * | 2/1970 | Pincus ....................... 52/79.1 |
| 3,596,968 | A |   | 8/1971 | Holm |
| 3,683,571 | A |   | 8/1972 | Walz, Jr. et al. |
| 3,697,098 | A | * | 10/1972 | Fisher ..................... 280/415.1 |
| 3,712,004 | A |   | 1/1973 | Loebsack |
| 3,738,678 | A |   | 6/1973 | King et al. |

(Continued)

Primary Examiner—Jeanette Chapman
(74) Attorney, Agent, or Firm—Brinks Hofer Gilson & Lione

(57) ABSTRACT

Off-site factory built structure employs a chassis including two interior longitudinal beam members joined at their ends to a perimeter structure. A floor system is integrated within the chassis perimeter. A ledger member is fixed to the inner surface of each longitudinal perimeter member so that a top surface lies in a plane coincident with top surfaces of the interior longitudinal beams. Lateral members are coupled to the tops of the interior longitudinal beams and to the top of the ledger members. The lateral members include secondary stiffening members such as C-channel members, metal Z-channel members, or other metal members of similar structural capacity, spaced apart from each other by a maximum distance S, related to the width of the floor system W, by the equation:

S 12–½W.

19 Claims, 11 Drawing Sheets

U.S. PATENT DOCUMENTS

| | | | |
|---|---|---|---|
| 3,806,147 A | | 4/1974 | Hanson |
| 3,830,024 A | | 8/1974 | Warnke |
| 3,879,050 A | * | 4/1975 | Young .................... 414/540 |
| 3,913,286 A | * | 10/1975 | Boutacoff ................ 52/653.1 |
| 3,917,136 A | * | 11/1975 | Carson .................... 224/331 |
| 3,990,197 A | | 11/1976 | Johnston |
| 4,015,375 A | * | 4/1977 | Lindsay .................... 52/143 |
| 4,027,439 A | | 6/1977 | Willard |
| 4,110,952 A | | 9/1978 | Blachura |
| 4,131,301 A | | 12/1978 | Werner |
| 4,232,884 A | | 11/1980 | DeWitt |
| 4,358,134 A | | 11/1982 | Scully |
| 4,480,420 A | | 11/1984 | Shacket et al. |
| 4,501,098 A | * | 2/1985 | Gregory .................... 52/79.1 |
| 4,517,781 A | | 5/1985 | LeBlanc |
| 4,570,967 A | | 2/1986 | Allnutt |
| 4,573,292 A | * | 3/1986 | Kaufman et al. ............ 52/79.1 |
| 4,630,548 A | | 12/1986 | Wiger et al. |
| 4,644,708 A | | 2/1987 | Baudot et al. |
| 4,807,407 A | | 2/1989 | Horn |
| 4,971,355 A | | 11/1990 | Studdard |
| 5,050,374 A | * | 9/1991 | Hunter ...................... 60/780 |
| 5,113,625 A | | 5/1992 | Davis |
| 5,226,583 A | | 7/1993 | Imashimizu et al. |
| 5,245,802 A | | 9/1993 | Davis |
| 5,353,558 A | | 10/1994 | Shea, Sr. et al. |
| 5,402,618 A | | 4/1995 | Biffis et al. |
| 5,468,008 A | | 11/1995 | Hecht |
| 5,488,809 A | * | 2/1996 | Lindsay .................... 52/653.1 |
| 5,579,622 A | | 12/1996 | DeVon et al. |
| 5,640,814 A | | 6/1997 | Godfrey |
| 5,784,849 A | | 7/1998 | DeVon et al. |
| 5,921,030 A | * | 7/1999 | Ducotey et al. ................ 52/3 |
| 6,038,824 A | * | 3/2000 | Hamrick, Sr. ................ 52/143 |
| 6,044,610 A | * | 4/2000 | DeVon et al. ............. 52/653.1 |
| 6,076,311 A | * | 6/2000 | Godfrey .................... 52/143 |
| 6,463,705 B1 | * | 10/2002 | Davis et al. .................. 52/143 |
| 6,615,549 B1 | * | 9/2003 | Hodge et al. .................... 52/7 |
| 6,668,496 B1 | * | 12/2003 | Clapp et al. ................ 52/79.1 |
| 6,675,540 B1 | * | 1/2004 | Rokes ........................ 52/143 |

* cited by examiner

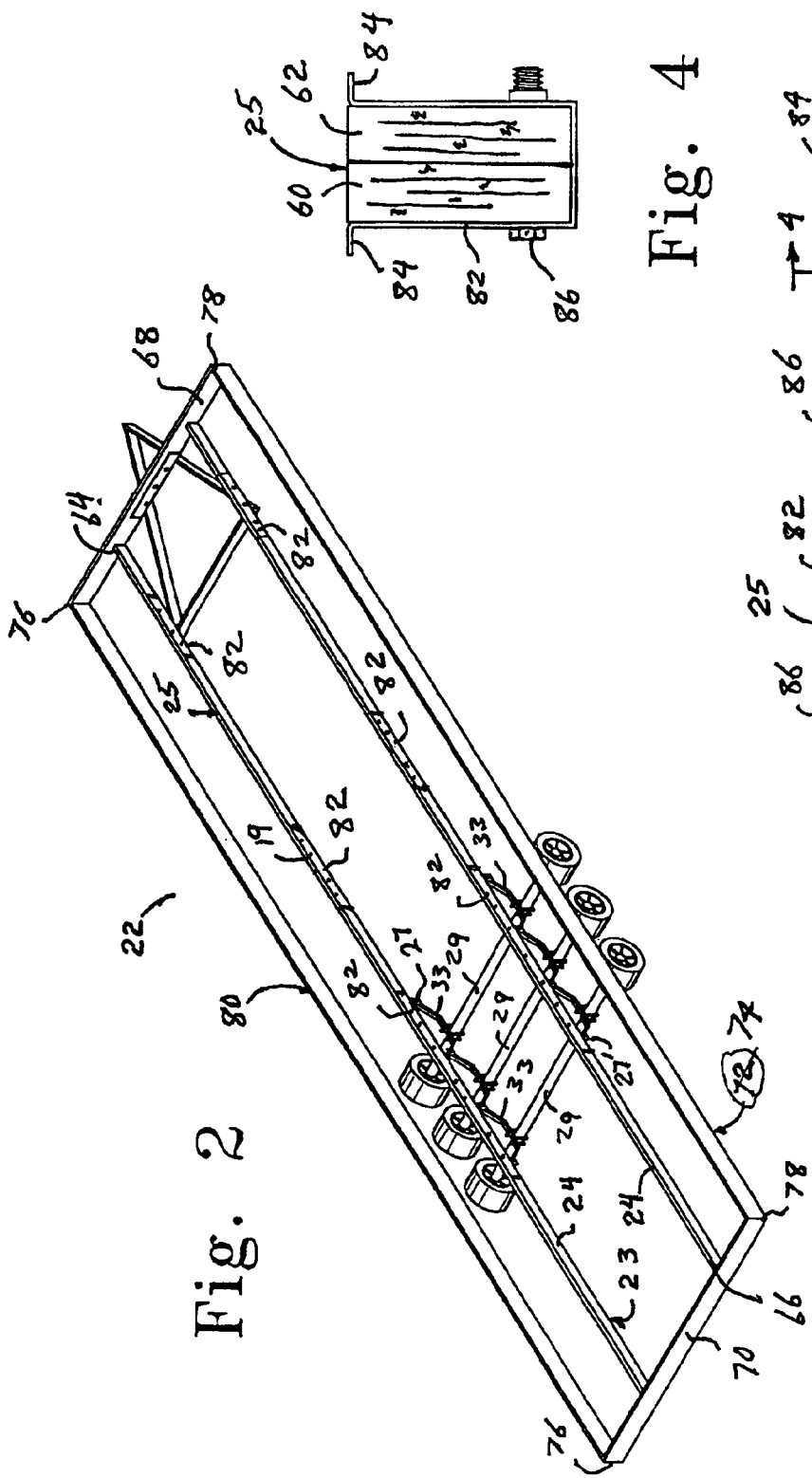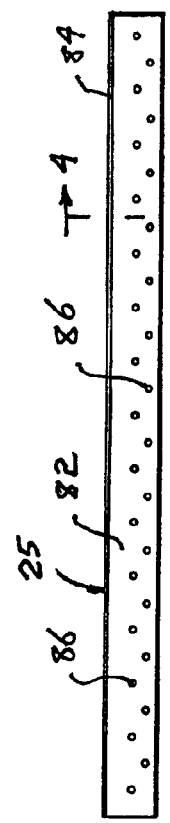

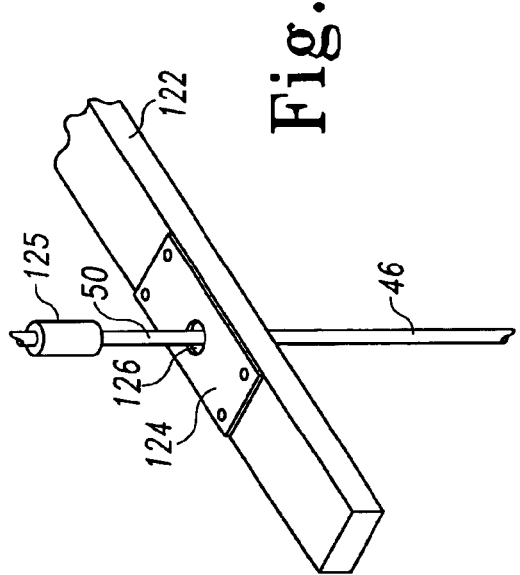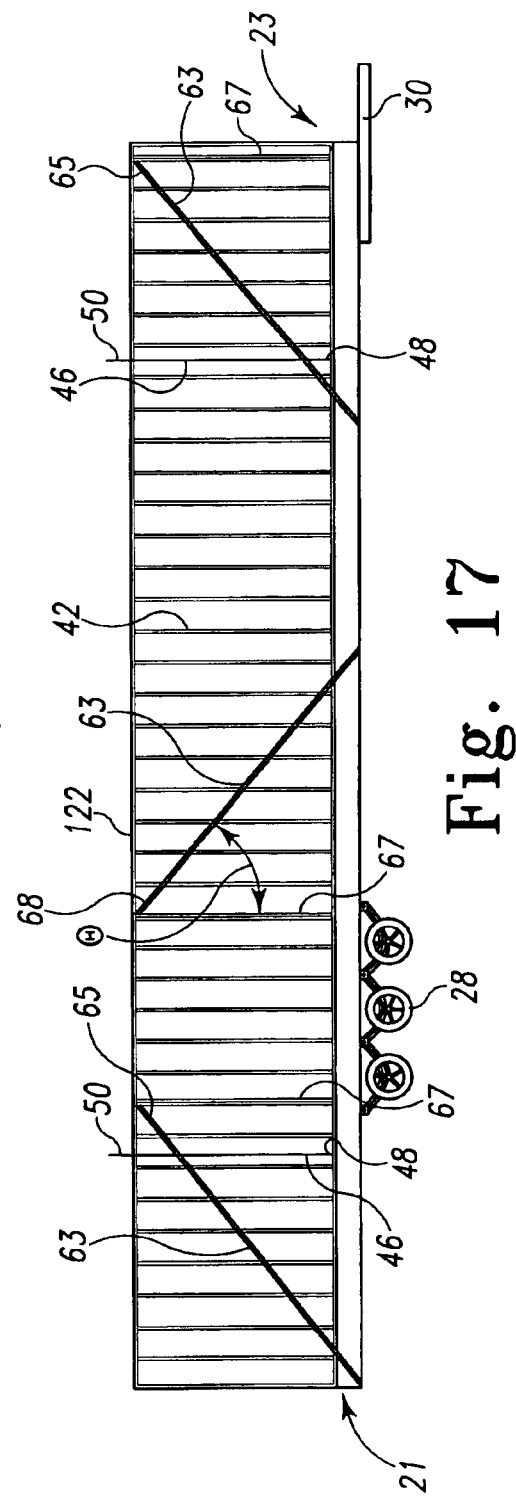

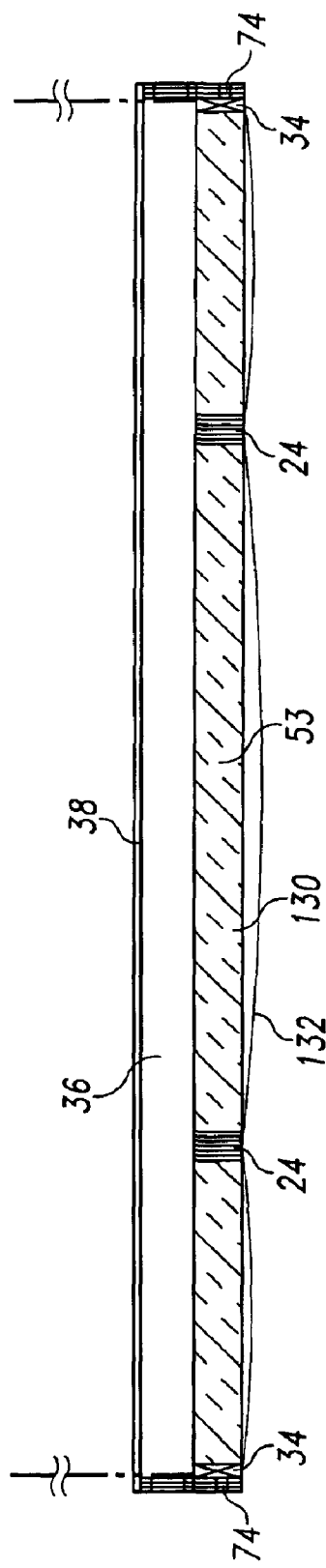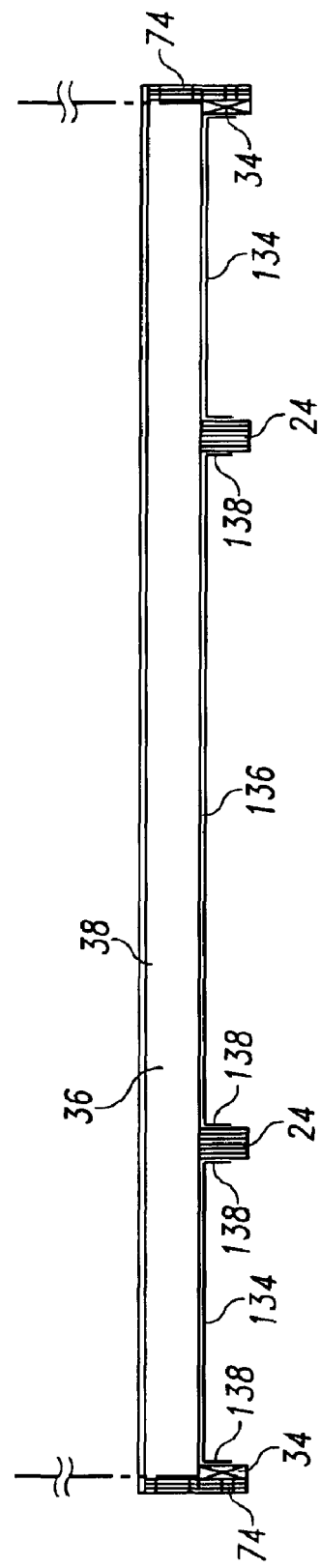

BUILDING SYSTEM

CROSS-REFERENCE TO RELATED APPLICATION

This application is related to, and claims all available rights and benefits of, U.S. Provisional Application Ser. No. 60/386,303 filed Jun. 5, 2002.

BACKGROUND OF THE INVENTION

The present invention is directed to a building system especially useful in off-site, factory built structures including manufactured and modular constructions as well as in recreational vehicles, panelized housing and other buildings that are transportable from the manufacturing location to a final site of more or less fixed location. The present invention is particularly directed to a chassis system to be employed in the construction and transport of the structure. The invention is also directed to a floor system to be used in cooperation with the chassis that provides important advantages. The invention is also directed to an integrated lifting system for the structure so that the structure can be installed easier, safer, with less labor, and with less opportunity for damage.

Conventional off-site factory built structures are typically built on a chassis constructed of a pair of spaced, parallel longitudinal steel I-beams running the length of the structure. A floor is generally constructed of a plurality of floor joists laterally arranged with respect to, and supported by, the longitudinal steel I-beams. Outriggers are fixed to the parallel longitudinal I-beams and extend laterally outward from the outer sides of the I-beams to support the outer walls of the structure. A running gear is attached to the longitudinal I-beams near one end of the structure, while a towing hitch is coupled to the opposite end of the longitudinal I-beams so as to allow the structure to be transported from the manufacturing location to the final site of installation or use. At the installation site, a support structure is generally employed to support the I-beams of the off-site factory built unit. This support structure typically takes the form of plurality of piers or posts located in a crawl space, with the piers or posts directly underlying the I-beams. Where two or more such units are used to construct a single building, multiple rows of piers are required for the supporting structure. Illustrative examples of such construction and support can be found in U.S. Pat. Nos. 3,042,423; 3,830,024; 4,131,301; 4,232,884; 4,517,781; and 5,353,558.

In many situations, it would be desirable to locate an off-site factory built unit of this type over a basement instead of a crawl space. A supporting structure in the form of rows of piers is not an acceptable feature in a conventional basement. Instead it is desirable to have a perimeter support, possibly augmented with a limited number of central supports for multiple unit structures. To achieve a perimeter support for structures of this type, additional cross beams can be added that increase the depth of the cavity, or the plurality of outriggers that are fixed to the parallel I-beams are strengthened and secured to the I-beams sufficiently to permit the load transfer. In this manner the floor load that is carried by the I-beams is transferred to the perimeter of the structure so that it can be supported by a foundation or basement wall, longitudinal center post beam, or the like as disclosed in U.S. Pat. Nos. 4,971,355; 5,579,622; 5,640,814; 5,784,849; and 6,044,610. While this solution improves the space utilization for any basement, the placement of any stairwell to that basement remains restricted. The longitudinal I-beams remain as the principal load support for the floor and cannot generally be cut to allow for the placement of a stairwell across that portion of the floor structure. While a lateral beam structure as disclosed in U.S. Pat. No. 4,027,439 can be employed, the added vertical height of the system is significant, and the added cost sufficiently prohibitive that the solution is rarely used.

What is needed is a system for constructing off-site factory built structures that eliminates the need for the metal longitudinal I-beams and outriggers, and provides substantial support for the floor of the structure on a perimeter support so that a conventional basement wall or foundation can be employed to support the structure at its final location, and a stairwell can be inserted at virtually any desired location. What is further needed is a chassis and floor construction of minimum vertical height, which will reduce the required stair run length for stairways associated with the building, and facilitate use of the structures in two-story systems. What is additionally desired is a chassis and floor construction that will permit removal of any running gear once the unit has be situated on the perimeter support. What is additionally desired is a system that will facilitate the installation of the off-site factory built structure on the perimeter support.

SUMMARY OF THE INVENTION

Off-site factory built structures constructed in accordance with the present invention employ a chassis that includes two interior longitudinal beam members, replacing the conventional steel I-beams. The interior longitudinal beam members preferably take the form of laminated veneer lumber (LVL) beams, metal double C-channels, or metal box tubes. The ends of the two parallel interior longitudinal beams are joined to a perimeter structure. The perimeter structure includes a pair of lateral perimeter members joined to the ends of the interior longitudinal beams. The perimeter structure also includes a pair of longitudinal perimeter members that complete the chassis structure. The longitudinal perimeter members are also preferably constructed of laminated veneer lumber or metal C-channel, and are sufficiently strong to provide substantial longitudinal support for the structure. A running gear mechanism can be coupled to the longitudinal members near one end of the chassis and a hitch can be coupled to the opposite end of the chassis to permit the chassis, and any structure built in connection therewith, to be towed from the place of manufacture to a use site.

A building system of the present invention also includes a floor system that is integrated within the outer perimeter structure of the chassis. The floor system includes a ledger member fixed to the inner surface of each of the longitudinal perimeter members. The ledger members are positioned to have a top surface lying in a plane coincident with the top surfaces of the two interior longitudinal beam members. The floor further includes a plurality of lateral members coupled to the tops of the interior longitudinal beam members. The plurality of lateral members are also coupled to the top of the ledger members and/or the inside surface of the longitudinal perimeter members. The lateral members have a top surface lying on a plane coincident with the top surface of the perimeter members defining the chassis. The lateral members can be wood joists ranging from 2×6 to 2×12, or can be constructed of metal C-channel members of a similar dimension. When formed of conventional wood joists, the floor system must include some secondary stiffening members having an enhanced strength of at least about 3 to 4 times the strength of the usual floor joists. The secondary stiffening members can be metal C-channel members, metal Z-channel members, or other metal members of similar structural capacity. The secondary stiffening members should be spaced apart from each other by a maximum distance that is related to the total width of the floor system to be spanned by the secondary stiffening members. The maximum spacing between the required secondary stiffening members, S, is related to the width of the floor system, W, by the equation:

$$S\ 12-\tfrac{1}{2}W,$$

where S and W are measured in feet. The ends of the lateral members, and including the required secondary stiffening members, are secured to the longitudinal perimeter members or to the ledger members. While the required secondary stiffening members can replace wood joists in the locations where they are used, the preferred structure employs C-channel members that are added to, rather than replace, wood floor joists in a contiguously abutting relation. It will be appreciated that there is no real minimum spacing between members having a stiffness equal to the required secondary stiffening cross members, however, it is anticipated that any spacing of less than about 16 inches (40 cm) would be unlikely due to cost. The floor system is completed with conventional sheeting that is installed on the top surface of the lateral members and perimeter-defining members. The sheeting can include one or more panels that are designed for easy removal to permit ready access to any utility or mechanical elements placed below the top surface of the floor system.

A structure using a floor system of the present invention can be safely installed onto a perimeter supporting structure, whether that structure constitutes a perimeter foundation, basement wall, or other support, without the need for any piers that are typically used to support the longitudinal beams of conventional modular construction. Of course, one or more piers or a girder may be required at a marriage line of two structures of the present invention when placed side by side. Further, once the floor system of the present invention is positioned on the perimeter foundation, a stairwell can be inserted at any position since the interior longitudinal beam members no longer act as the sole or even principal supporting structure for the floor. Additionally, since the running gear or other carrier that the structure is placed on for transportation from the factory is attached directly to the longitudinal beam members, and can be removed at the final site, the material to be returned to the factory is minimal as compared to the prior art. Also, by omitting the conventional steel I-beams, the structure is believed to have less detrimental environmental impact.

A perimeter wall of any conventional design can be constructed on top of the floor system. The perimeter wall can include typical doors and windows according to the variations of design known to those skilled in the art of off-site factory built structures. One special feature of the perimeter wall of the present construction can be the incorporation of lifting members, which preferably take the form of at least two steel rods, in each of the longitudinal sidewalls. The lifting members are preferably secured to ends of a required secondary stiffening cross-member of the floor structure and extend upward through the walls to emerge through the top plate of the perimeter wall. An engagement coupling is provided on each of the vertical lifting rods to permit engagement by a crane, preferably using a spreader system so that a purely vertical force can be applied to the lifting members, the entire factory built structure, including the chassis, floor, and wall structures supported by the floor, can be lifted as a unit. The lift system allows for quicker and safer installation of the manufactured unit onto a supporting structure, whether that structure constitutes a perimeter foundation, basement wall, or other structure, for example, a similar manufactured unit thereby forming a two-story structure. In a further preferred embodiment, the vertical lift members have end coupling structures that improve the wind resistance of the entire assembly. The lift system can also be employed to couple two vertically-arranged units together in tension so that the wind resistance of even the second story is significantly improved. Additional wind resistance and strength during transport can be provided by a pattern of diagonal tension members that can be in the form of steel or industrial polyester strapping.

Additional features and advantages of the present invention will be understood in the following discussion of illustrated embodiments of the present invention as shown in the accompanying Figures.

BRIEF DESCRIPTION OF THE DRAWINGS

FIG. 2 is a perspective view of a chassis constructed in accordance with the present invention including a running gear.

FIG. 3 is a side elevation view of a portion of the interior longitudinal beam member engaged by the running gear.

FIG. 4 is a sectional view taken through lines 4—4 of FIG. 3.

FIG. 16 is a perspective view showing the vertical tension member passing through the sidewall top plate.

FIG. 17 is a side elevation view of a manufactured building according to the present invention illustrating the location of the tension members and a typical location for the running gear.

FIG. 20 is a sectional view of the floor similar to FIG. 13 but showing the addition of insulation and vapor retarding barriers.

FIG. 21 is a view similar to FIG. 20 showing an alternative vapor retarding barrier scheme.

DESCRIPTION OF PREFERRED EMBODIMENTS

Figure 1:
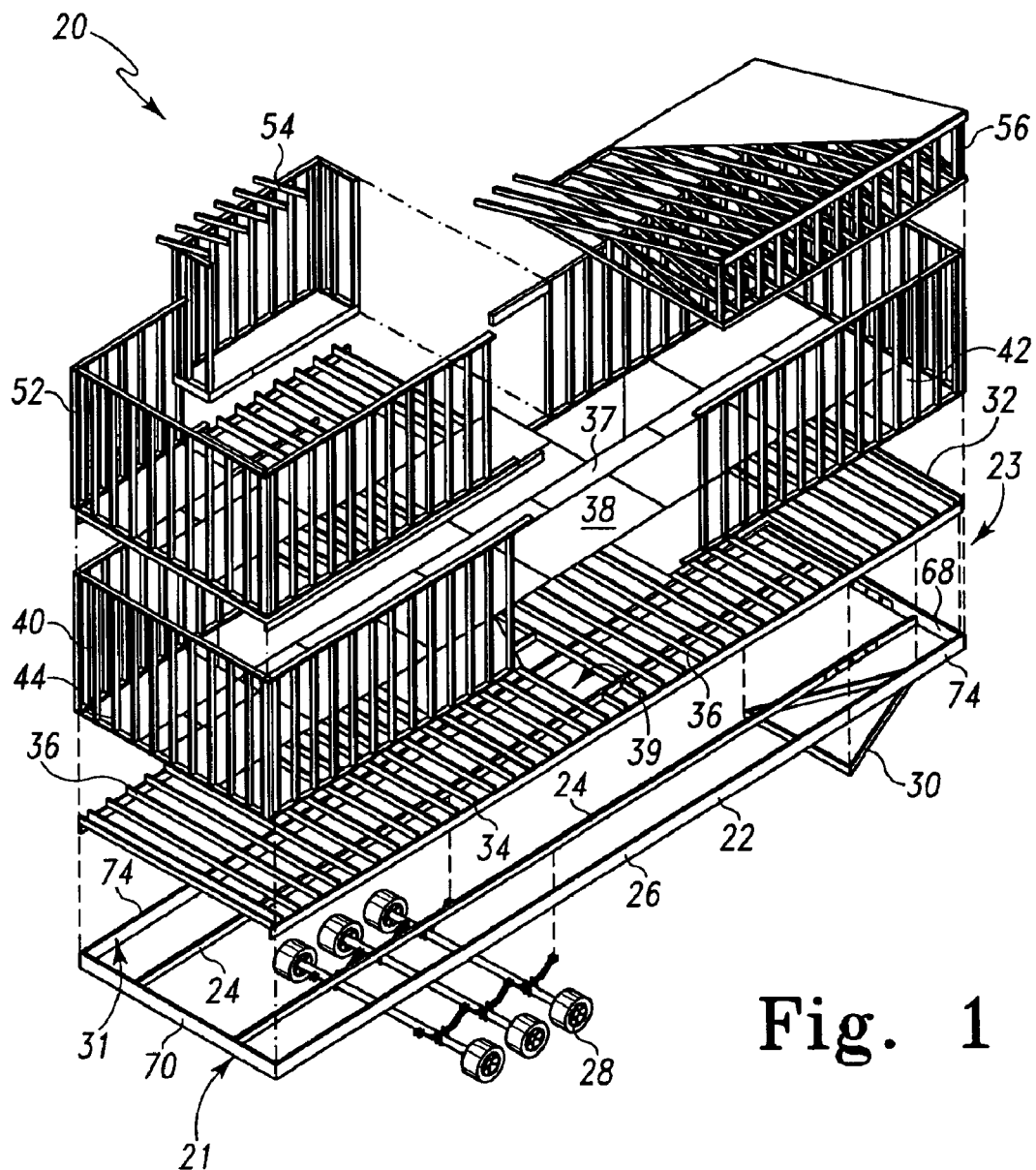
FIG. 1 is an exploded perspective view of a off-site factory built structural unit demonstrating the features that are afforded by the present invention.

An off-site factory built structure 20 in accordance with the present invention is shown in an exploded perspective view in FIG. 1. The structure 20 includes a chassis 22 having of a pair of parallel interior longitudinal beam members 24. A rectangular perimeter 26 is coupled to the ends of the longitudinal beam members 24. The rectangular perimeter 26 is defined by a pair of lateral perimeter members 68 and 70 coupled to the ends of the longitudinal beam members 24. The lateral perimeter members 68 and 70 include ends joined to ends of two longitudinal perimeter members 74. A running gear 28 is coupled to the bottom of the interior longitudinal beam members 24 near a rearward end 21 of the chassis 22. A tow member 30 is coupled to a forward end 23 of the chassis 22. Further details of the chassis 22 are provided in the subsequent description of FIGS. 2–8.

A floor system 32 is shown in the exploded view of FIG. 1 elevated above the chassis 22. It will be appreciated that the floor system 32 is constructed on and within the chassis 22 as previously described, and as later detailed in connection with FIGS. 9–13. The floor system 32 includes ledger members 34 fixed to an inside surface 31 of the longitudinal perimeter members 74. A plurality of lateral members in the form of floor joists 36 are arranged generally parallel to each other with their opposite ends supported on the ledger members 34. Suitable openings 39 can be provided in the floor system 32, which are arranged either laterally or longitudinally with respect to the chassis 22 and floor system 32, to permit the insertion of stairways. Floor sheeting 38 is secured on top of the floor joists 36 to define the floor surface. Additional access panels 37 can be provided to permit convenient access to ducting, electrical, piping, etc., below the floor system 32. The chassis 22 provides substantial support for the floor system 32 on the perimeter members 68, 70 and 74 so that a conventional basement wall or foundation can be employed to support the structure 20 at its final location.

The off-site factory built structure 20 of the present invention can also include a perimeter wall structure 40 and various interior walls. The perimeter wall structure 40 is susceptible to some considerable variation in style and materials as later detailed in connection with FIGS. 1 and 14 through 19. The perimeter walls are generally formed from a pair of longitudinal walls 42 defining the sides of the structure 20 and a pair of lateral walls 44 defining the ends of the structure 20. The longitudinal walls 42 of the present invention can include tension members 46 that are discussed in detail in connection with FIGS. 13–17. The lower end structure 48 of the tension members 46 is shown in detail in FIGS. 14–15, while the upper end structure 50 of the tension members 46 is shown in greater detail in FIG. 16.

The off-site factory built structures 20 of the present invention can easily include second story structures 52, gabled portions 54, as well as other architectural variations that can be executed with greater confidence using the building system of the present invention. One interesting feature of the present invention is that the chassis 22 has a lower vertical profile than the typical steel I-beam chassis in common use today. This lower vertical profile of the chassis 22 permits the roof pitch shown at 56 to be greater than is generally achievable with today's conventional off-site factory built structures. The lower vertical profile of the chassis 22 also permits a taller sidewall height than do conventional structures.

Turning to the details shown in FIGS. 2–6, the chassis 22 is shown to include interior longitudinal beam members 24 that preferably take the form of laminated veneer lumber (LVL) beams, but can also be formed of a flitch beam, a metal double C-channel, or a metal box tube. The interior longitudinal beam members 24 are shown in cross-section in FIG. 4 to be formed of a side-by-side pair of $1\frac{1}{2} \times 5\frac{1}{2}$ inch (3.8×14.0 cm) LVL members 60 and 62. The vertical size of the interior longitudinal beam members 24 can be increased to create an increased space to receive mechanicals, such as piping and ducting that will serve the structure as shown, for example, in FIGS. 9 and 13. The increase in the size of the interior longitudinal beam members 24 can also be dictated in circumstances where the load to be carried by the floor structure, especially during transport, is greater than normal. The interior longitudinal beam members 24 are preferably continuous from a forward end 64 to a rearward end 66. However, when necessary, the interior longitudinal beam members 24 can include a splice 19. The splice 19 preferably includes a U-shaped channel member 82 having outwardly extending flanges 84 as shown in FIGS. 3 and 4. A plurality of fasteners 86 are distributed, preferably in a pattern as shown in FIG. 3, to secure the channel member 82 to the interior longitudinal beam member 24 in the region of the splice 19. A similar configuration can be employed with any splice in one of the longitudinal perimeter members 74. The preferred location of any splice 19 of the longitudinal beam members 24 or longitudinal perimeter members 74 is at a distance D measured from the hitch 30 that is provided by the equation:

$$D=L(1-(A^2/L^2)),$$

where L is the distance from the hitch 30 to the front shackle 27 of the running gear 28, and A is the distance from the rear shackle 27' of the running gear to the rearward end perimeter member 70. The location of any splice can vary from the preferred location by about ±20% without any significant reduction in strength or reliability.

A front perimeter member 68 is fixed to the forward end 64 of the interior longitudinal beam members 24. A similar rearward perimeter member 70 is fixed to end 66 of the interior longitudinal beam members 24. Perimeter end members 68 and 70 are parallel to each other and include a lower surface 72 that generally lies in a plane coincident with the plane defined by the lower surfaces of interior longitudinal beam members 24. A pair of longitudinal perimeter members 74 are joined to the lateral outer ends 76 and 78 of the forward and rearward perimeter end members 68 and 70, respectively, so that perimeter members 68, 70 and 74 define a rectangular perimeter for the chassis 22. The perimeter members 68, 70 and 74 are also preferably constructed of laminated veneer lumber, although steel C-channel or box beam members can be substituted. The upper surfaces 80 of the perimeter members 68, 70 and 74 are co-planar and lie in a plane spaced above the plane defined by the upper surfaces 25 of the interior longitudinal beam members 24 by a distance selected based upon the vertical dimension of the floor joists 36 to be used in the structure as described below in connection with FIGS. 9 through 13. The perimeter members 68, 70 and 74 of the chassis 22 provide substantial support for the floor of the structure on any underlying perimeter support so that a conventional basement wall or foundation can be employed to support the structure 20 at its final location.

In the preferred embodiment, the metal U-shaped channel member 82, shown in cross-section in FIG. 4, envelopes the sides and lower surface of the interior longitudinal beam members 24 at the location of the running gear 28. The running gear 28 is shown in FIGS. 1 and 2 to comprise a plurality of axles 29, each axle 29 being fixed to a pair of leaf springs 33 that are located under and coupled to the interior longitudinal beam members 24 by way of the metal U-shaped channel member 82. The U-shaped channel member 82 generally includes outwardly extending flanges 84. The fasteners 86 or alternative fasteners, not shown, can be employed to secure the running gear 28 to the longitudinal beams. The U-shaped channel, particularly with the outwardly extending flanges 84, provides additional strength to the chassis in the location of the running gear while the structure 20 is in transit. Once the structure 20 is at the final site, the running gear 28 can be uncoupled from the longitudinal beams, but the channels 82 need not be removed.

Figure 5:
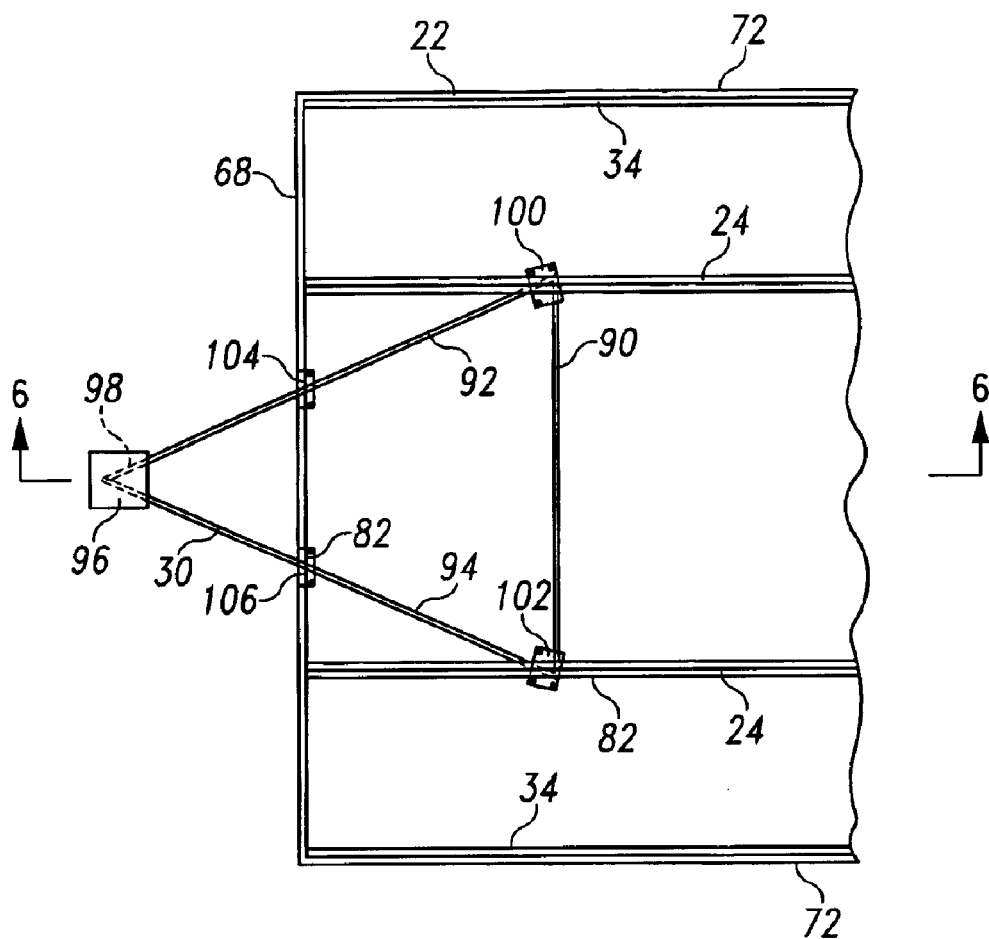
FIG. 5 is a plan view of the towing coupling at the front end of the chassis.
Figure 6:
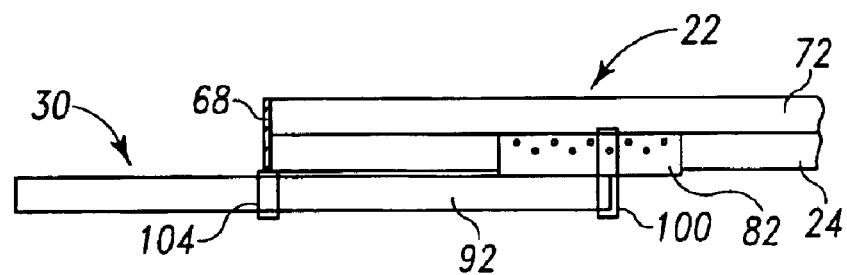
FIG. 6 is a sectional view of the front end of the chassis taken along line 6—6 of FIG. 5 showing the towing coupling member.

A similar form of channel 82 can also be employed on the interior longitudinal beam members 24 to secure the tow hitch 30 to the chassis 22. The tow hitch 30 is shown in FIGS. 5 and 6 to include a lateral rear member 90 and two angled forwardly extending members 92 and 94 coupled together to form an isosceles triangle. The length of the two angled forwardly extending members 92 and 94 is preferably determined by the placement of certain required lateral secondary stiffening members 36', discussed below. A conventional coupling element 96 can be fixed to the apex 98 of the triangular formation at the junction of the sides 92 and 94 to permit the chassis and related off-site factory built structure to be towed. Removable coupling members 100 and 102 couple the ends of member 90 to the interior longitudinal beam members 24 at the location of the U-shaped channel members 82 as shown in FIGS. 5 and 6. Additional coupling members 104 and 106 temporarily couple legs 92 and 94 to the bottom of the front lateral perimeter member 68. The front lateral perimeter member 68 can be strengthened in the region of the coupling members 104 and 106 by a channel member similar to channel member 82.

Figure 7:
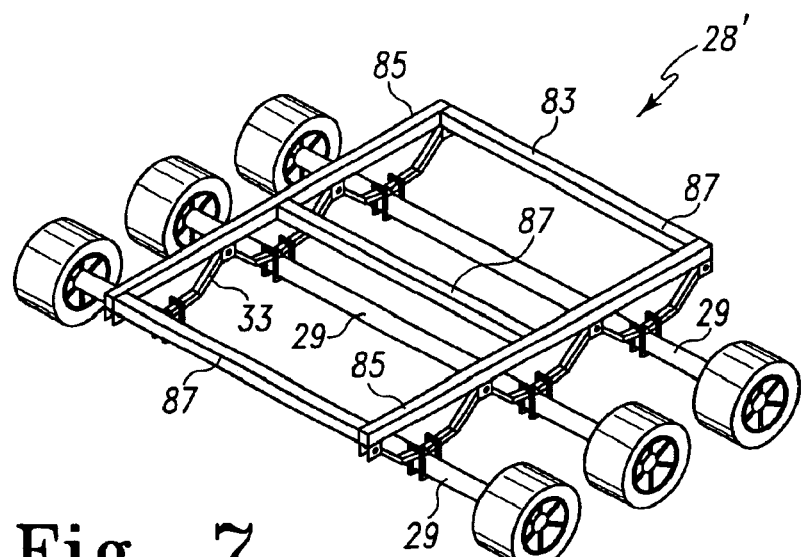
FIG. 7 is a perspective view of an alternative running gear carrier.
Figure 8:
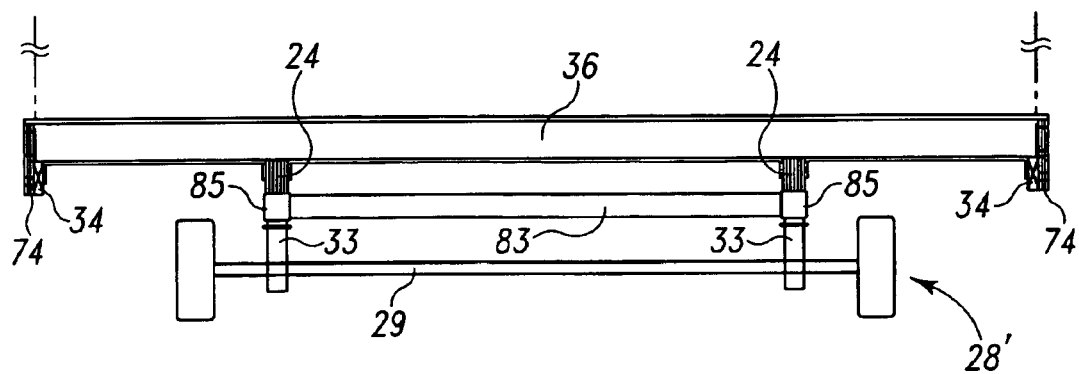
FIG. 8 is a sectional view of a chassis supported on the running gear carrier of FIG. 7.

An alternative embodiment of the running gear 28' is shown in FIGS. 7 and 8 to include a generally rectangular frame 83 formed by a pair of longitudinal members 85 spanned by a plurality of lateral members 87 that space the longitudinal members 85 by a distance that can be about equal to the separation distance between the interior longitudinal beam members 24. In this alternative embodiment, the running gear 28' includes a plurality of axles 29, each axle 29 being fixed to a pair of leaf springs 33, the springs 33 being located under and coupled to the longitudinal members 85. The longitudinal running gear members 85 can be coupled to the interior longitudinal beam members 24 as shown in FIG. 8 at the off-site factory and later removed when the structure 20 is at the final site of use. The alternative embodiment of the running gear 28' shown in FIG. 7 can have lateral members 87 that space the longitudinal members 85 by a distance about equal to the separation distance between the longitudinal perimeter members 74 and can be coupled to the members 74 in addition to or instead of the interior longitudinal beam members 24. The alternative embodiment of the running gear 28' shown in FIGS. 7 and 8 can provide additional road clearance during transport, and is more easily handled during its return to the off-site factory.

Figure 9:
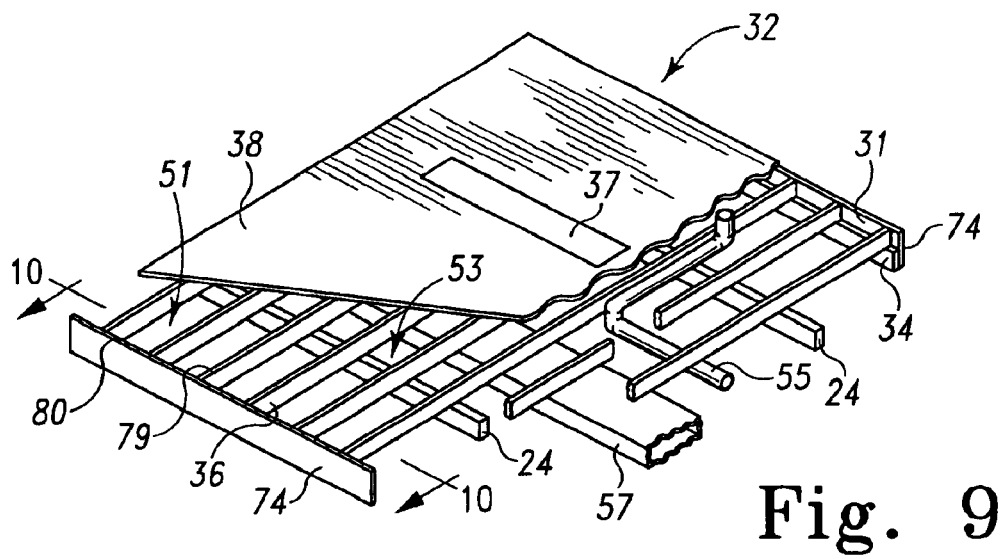
FIG. 9 is a perspective view of a portion of the floor structure and chassis including possible mechanical/utility locations.
Figure 10:
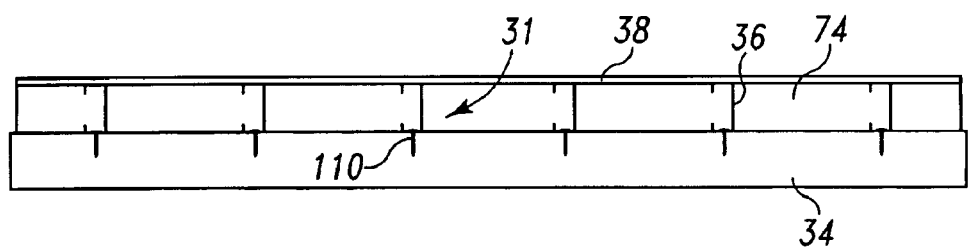
FIG. 10 is a sectional view taken along line 10—10 of FIG. 9.
Figure 11:
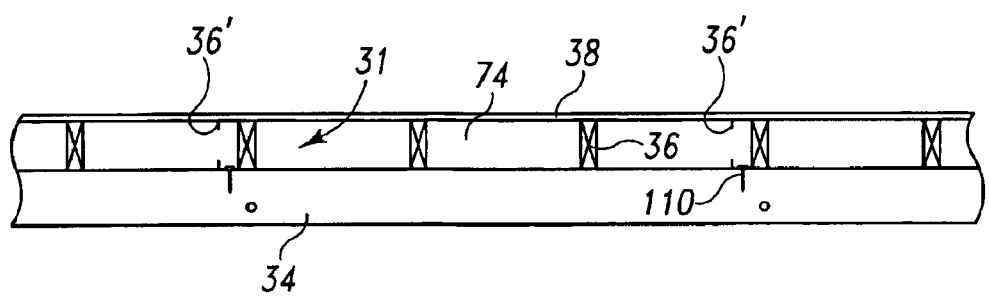
FIG. 11 is a sectional view similar to FIG. 10 of an alternative embodiment for the floor structure.
Figure 12:
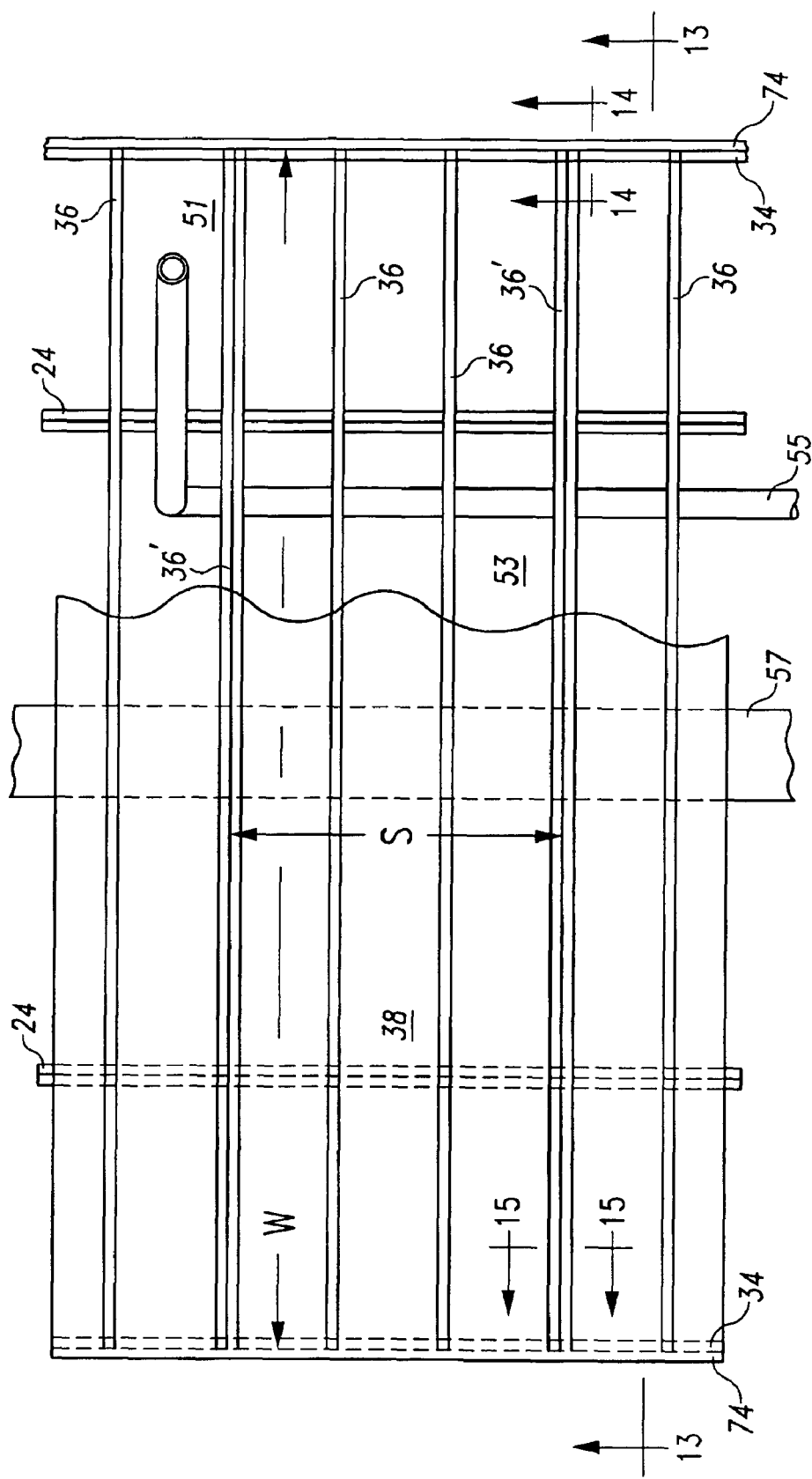
FIG. 12 is an elevation of the floor structure illustrated in FIG. 9.
Figure 13:
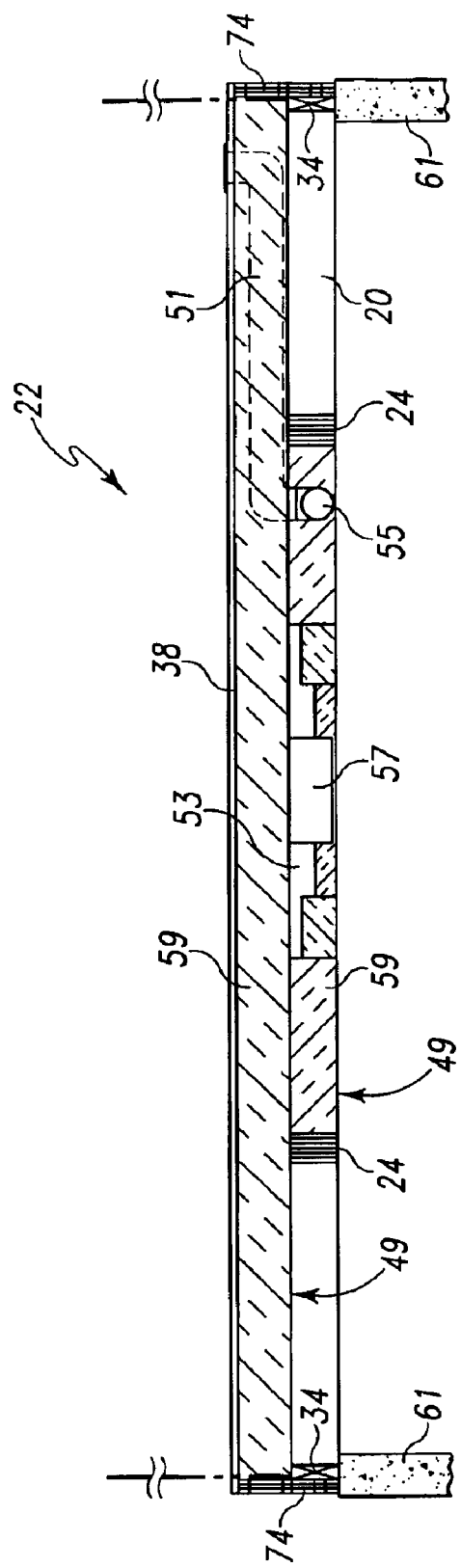
FIG. 13 is a sectional view through the floor and chassis taken along line 13—13 from FIG. 12, the chassis being positioned on a peripheral support.
Figure 14:
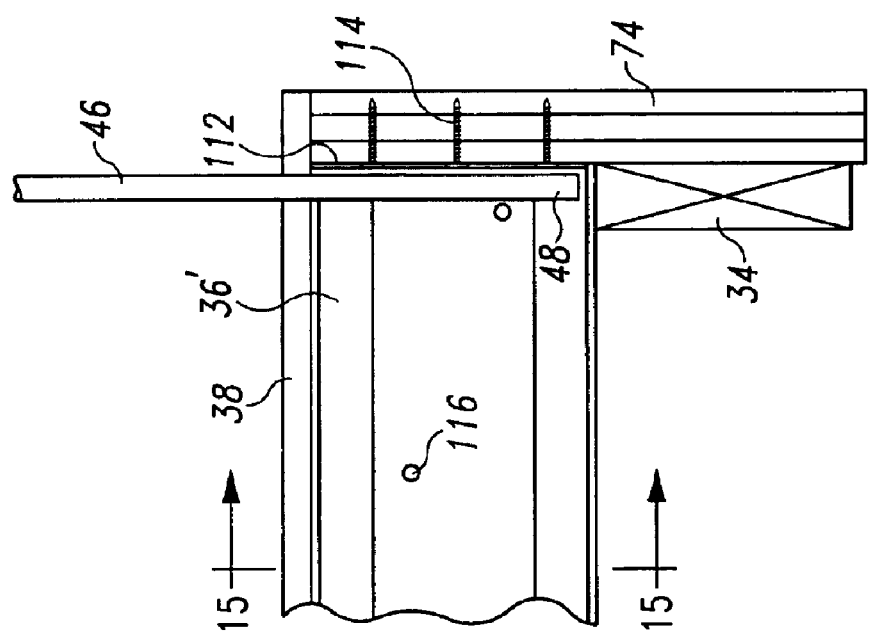
FIG. 14 is an enlarged sectional detail of a longitudinal perimeter member and related structure taken along line 14—14 from FIG. 12 and showing a vertical tension member.

Turning to FIGS. 9 through 15, which show the arrangement of the various elements of the floor structure 32 in relation to the chassis 22, the ledger members 34 are secured to the inner surface 31 of the longitudinal perimeter members 74 of the chassis 22 so that the bottom surface of the ledger member 34 and the bottom surface of the longitudinal perimeter 74 are nearly co-planer, as best illustrated in FIG. 14. The lateral members forming the floor joists 36 are positioned to sit on top of the upper surfaces of the ledger members 34 and the interior longitudinal beam members 24 as shown in FIGS. 9, 12 and 13. The floor joists 36 have a top surface 79 lying in a plane coincident with the top surface 80 of the perimeter members 74 defining the chassis as shown in FIGS. 9 and 14. Standard sheeting material 38 extends across the top surface 79 of, and can be secured to the top surface 79 of the floor joists 36 as well as the top surfaces 80 of the longitudinal perimeter members 74 using conventional fasteners, adhesives, etc.

The floor joists 36 can take the form of metal C-channels, as shown in FIG. 10, metal Z-channels or other metal support structures that can be either laterally continuous or of open web design. The metal channel members can be secured to the interior longitudinal beam members 24 and to the ledger members 34 by suitable fasteners 110, typically taking form of screw fasteners. In the event the ledger members 34, interior longitudinal beam members 24 and/or the longitudinal perimeter members 74 are formed of a metal such as steel, the metal channel members forming the floor joists 36 can be welded in place rather than being secured using fasteners 110. In an alternate embodiment, shown in FIG. 11, the floor joists 36 can take the form of wood members, which can be toe nailed or otherwise secured to the interior longitudinal beam members 24 and ledger members 34. When the floor joists 36 take the form of wood members, additional secondary stiffening members 36', which can be in the form of C-channels or Z-channels are then coupled in a butting relation to selected floor joist 36 as shown in FIGS. 11 and 12. The additional secondary stiffening members 36' have strength equal to at least about three times the strength of the remaining floor joists 36. The additional secondary stiffening members 36' are preferably spaced from each other by a distance S that is related to the width W of the floor spanned by the joists 36 as shown in FIG. 12. The maximum spacing S between the required additional secondary stiffening members 36' is related to the width W by the equation:

$$S \ 12-\tfrac{1}{2}W,$$

where S and W are measured in feet. In a construction employing the additional secondary stiffening members 36', the length of the two angled forwardly extending members 92 and 94 of the tow hitch 30 shown in FIGS. 2, 5 and 6 are preferably sufficiently long as to ensure that the removable coupling members 100 and 102, and the member 90 are located under or immediately adjacent to one of the additional lateral secondary stiffening members 36'. The perimeter members 68, 70 and 74 of the chassis 22, including the ledger members 34, provide substantial support for the floor joints 36 and additional lateral secondary stiffening members 36' so the structure 20 can be placed on any underlying perimeter support such as a conventional basement wall or foundation at the final use location of the structure 20.

FIGS. 9, 12 and 13 additionally show a typical installation of the mechanicals, such as piping 55 and ducting 57 that will serve the structure 20. The central space 53 between the interior longitudinal beam members 24 and below the floor joists 36 can provide a suitable space for longitudinally deployed mechanicals. The outwardly extending space 51 between adjacent floor joists 34 and above the interior longitudinal beam members 24 can provide a suitable space for the lateral extension of the mechanicals from the central space 53. The sheeting 38 can include one or more panels 37 that are designed for easy removal to permit ready access to any utility or mechanical elements placed below the top surface of the floor system 32. The spaces 51 and 53 are also suitable to receive insulation 59 that can be protected on a lower surface by a vapor barrier 49 as shown, for example, in FIG. 13. FIG. 13 also shows the chassis 20 and floor structure 22 suitably positioned on a perimeter supporting structure 61 providing a foundation at a final use location.

Figure 15:
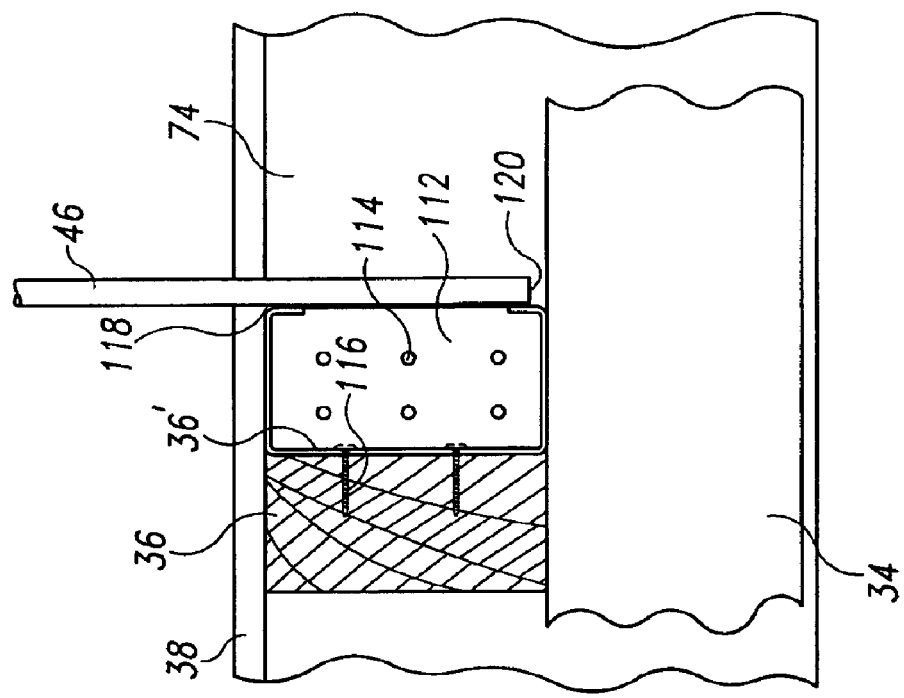
FIG. 15 is a sectional detail view of a lateral floor joist and related structure taken along line 15—15 of FIG. 12.

As shown in detail in FIGS. 14 and 15, the metal floor joists 36 and secondary stiffening members 36' can include end caps 112. The end caps 112 can be secured to the longitudinal perimeter members 74 by a plurality of fasteners 114 or by suitable welds if the longitudinal perimeter members 74 are constructed of a metal such as steel. Fasteners 116 can also be employed to fasten each additional secondary stiffening member 36' to a contiguously adjacent wood floor joist 36. While FIGS. 14 and 15 depict the use of metal C-channel members, it will be appreciated that metal Z-channel members shown in FIGS. 10 and 11, and other structures having the required structural strength can be substituted for the illustrated members.

The longitudinal walls 42 of the present invention can include vertical tension members 46 as shown in FIGS. 14–19. The vertical tension members 46 have a lower end 48 and an upper end 50 and preferably are in form of ¾ inch (11 mm) or greater diameter steel rods that can be secured, preferably by welding at locations 118 and 120, to the metal floor joists 36 or secondary stiffening members 36' in the immediate vicinity of any end plate 112. Each vertical tension member 46 stands upward through the interior of the perimeter sidewall 42, so that the upper end 50 extends through an opening in the top plate 122 as shown in FIG. 16. A planar reinforcement member 124, preferably made of steel and including a central opening 126, can be provided on the top plate 122 to receive the upper end 50 of the vertical tension member 46. A coupling 125 can be provided on the upper end 50 of each of the vertical lifting rods 46 to permit engagement by a crane, not shown, preferably using a spreader system so that a vertical force can be applied to the lifting members 46. The arrangement shown in FIG. 16 also permits any modest lateral forces applied to the top end 50 of the vertical tension member 46 to be quickly translated to the perimeter walls 40 as well as to the metal floor joists 36 or secondary stiffening members 36' to which the lower end 48 of the vertical tension member 46 is secured, to cause lateral movement of the building unit 20. This results in more stable control during lifting and lateral placement of a completed building unit 20 onto a perimeter supporting structure 61, for example.

Figure 18:
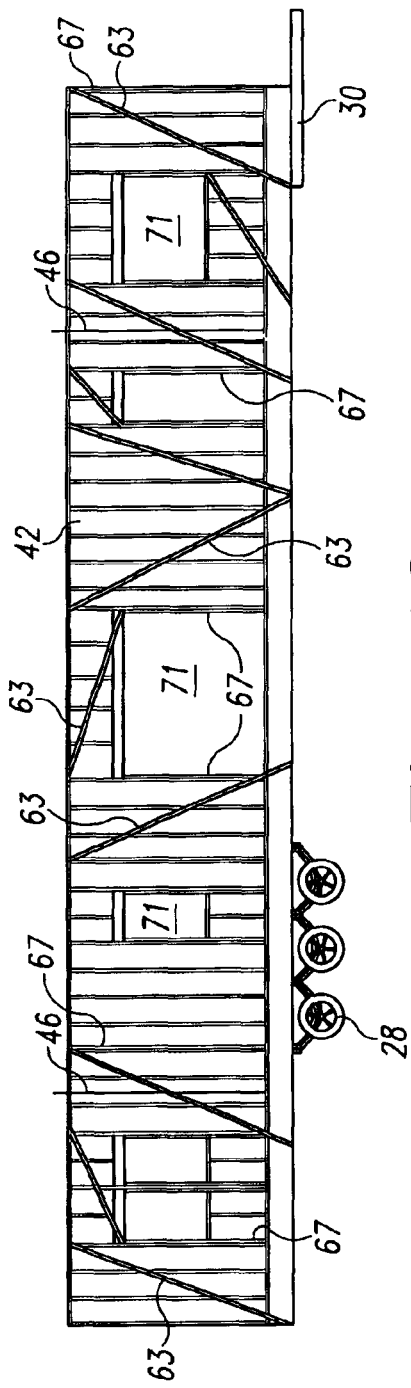
FIG. 18 is another side elevation view similar to FIG. 17 of a manufactured building according to the present invention.
Figure 19:
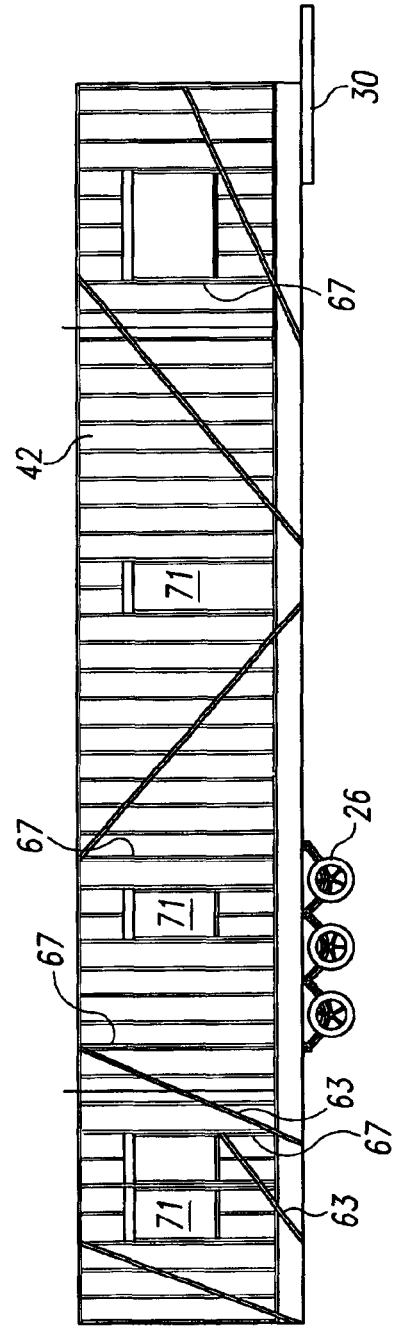
FIG. 19 is another side elevation view similar to FIGS. 17 and 18 of a manufactured building according to the present invention.

The vertical tension members 46 are preferably located as shown in FIGS. 17–19 so as to be spaced approximately 20% to 25% of the overall length of the finished unit 20 from ends 21 and 23. This placement of the vertical tension members 46 provides for a suitable balancing of forces during the lifting operation. Once the building unit 20 has been finally positioned, the couplings 125 on the upper ends 50 of the vertical tension members 46 can be removed. The upper ends 50 can also be welded to any similar tension members or to C-channel floor joists in a second story 52 that may be situated on top of the unit as shown in FIG. 1. Once the completed building unit 20 is positioned on a suitable foundation, the lower ends 48 of the vertical tension members 46 can be secured to tie down structures incorporated in the foundation.

The structural integrity of the perimeter sidewalls 42, especially during lifting and other transport of the completed unit, can be enhanced by the incorporation of diagonal tension members 63 as shown in FIGS. 17 through 19. The diagonal tension members 63 are preferably located at an angle θ with respect to the vertical of between about 30° to 50°, but can be inclined and lesser or greater angle when necessary to clear an obstruction or opening as shown, for example, in FIGS. 18 and 19. An upper end 65 of each diagonal tension member 63 is preferably coupled to a vertical compression member 67 that is included in the structure of the perimeter sidewalls 42. The vertical compression members 67 are preferably located above the tow member 30 and above the ends of the running gear 28 as shown in FIG. 17. Additional vertical compression members 67 can be located on either side of any opening 71 in the sidewalls 42 as shown, for example, in FIGS. 18 and 19. A lower end 69 of each diagonal tension member 63 is generally coupled to a longitudinal perimeter member 74, but as shown in FIG. 18, can also be coupled to a header 73 of an adjacent opening 71. The vertical compression members 67 can comprise a double-stud column forming a jamb of an opening 71, a corner at a bulkhead forming an end 21 or 23, or other similar double-stud column. The diagonal tension member 63 can comprise industrial strapping made of steel or polyester of the type typically used for high strength bailing, or other material having low creep and a tensile strength of at least about 1200 Kg and preferably about 2500 Kg. The diagonal tension members 63 can be temporarily applied to the structure after construction of the unit is substantially complete, but are preferably incorporated into the walls of the structure before the application of any outside decorative siding.

As shown in FIG. 20, the spaces 47 between the ledger member 34 and the interior longitudinal beam members 24 and the central space 53 between the two interior longitudinal beam members 24 can be filled with an insulating material 130. The insulating material 130 can be protected during transport by a sheet water vapor retarder 132 such as nylon reinforced polyethylene sheeting. An alternative water vapor retarder is shown in FIG. 21 to comprise hard panels 134 and 136 that are positioned between the ledger members 34 and the interior longitudinal beam members 24 in a manner similar to that shown in FIG. 13. Each of the hard pans 134 and 136 include a downwardly turned lip 138 extending along the length of the pans, which can be easily fixed to the ledger members 34 and longitudinal beam members 24 with suitable fasteners. The material forming the pans 134 and 136 can be sheet metal or extruded plastic that is generally preformed to fit the space.

Although several variations of the preferred embodiments of this invention have been described in detail above, those skilled in the art will readily appreciate that many modifications not described in detail above are possible without departing from the novel teachings and advantages of this invention as defined by the following claims.

What is claimed is:

1. A combined chassis and floor system for use in off-site factory built structures comprising:

a pair of parallel interior longitudinal beam members having an upper surface defining a common plane, a pair of end perimeter members joined to ends of the interior longitudinal beam members, the end perimeter members extending laterally beyond the interior longitudinal beam members, and extending above the common plane, a pair of longitudinal perimeter members joined to ends of the end perimeter members to form with the end perimeter members a rectangular perimeter assembly, ledger members fixed to an inner surface of the longitudinal perimeter members, the ledger members having an upper surface lying in said common plane, a plurality of metal floor joists extending laterally between the longitudinal perimeter members, the metal floor joists having a lower surface lying in said common plane and an upper surface lying in a plane defined by upper surfaces of the end and longitudinal perimeter members, and a plurality of metal vertical tension members extending perpendicularly to said common plane, each of the vertical tension members including an upper end projecting through a top plate of a perimeter wall, the top plate including a metal reinforcement member including a central opening receiving the vertical tension member upper end.

2. The combination of claim 1 wherein each metal tension member has a lower end fixed to one of the metal floor joists adjacent to a longitudinal perimeter member.

3. A combined chassis and floor system for use in off-site factory built structures comprising:

a pair of parallel interior longitudinal beam members having an upper surface defining a common plane, a pair of end perimeter members joined to ends of the interior longitudinal beam members, the end perimeter members extending laterally beyond the interior longitudinal beam members, and extending above the common plane, a pair of longitudinal perimeter members joined to ends of the end perimeter members to form with the end perimeter members a rectangular perimeter assembly, ledger members fixed to an inner surface of the longitudinal perimeter members, the ledger members having an upper surface lying in said common plane, a plurality of metal floor joists extending laterally between the longitudinal perimeter members, the metal floor joists having a lower surface lying in said common plane and an upper surface lying in a plane defined by upper surfaces of the end and longitudinal perimeter members, and an additional plurality of wood floor joists arranged between and parallel to the metal floor joists.

4. The combination of claim 3 wherein the maximum spacing S, between the metal floor joists is related to their lateral extent W, by the equation:

$S\ 12-\frac{1}{2}W.$

5. The combination of claim 3 wherein one of the additional plurality of wood floor joists is arranged in contiguously abutting relation to each metal floor joists.

6. The combination of claim 5 further comprising means coupling the contiguously abutting wood floor joists and metal floor joists.

7. The combination of claim 1 further comprising means for securing the ends of the floor joists to at least one of the longitudinal perimeter members and the ledger members fixed thereto.

8. The combination of claim 1 wherein said interior longitudinal beam members and said longitudinal perimeter members consist essentially of laminated veneer lumber.

9. A combined chassis and floor system for use in off-site factory built structures comprising:

a pair of parallel interior longitudinal beam members having an upper surface defining a common plane, a pair of end perimeter members joined to ends of the interior longitudinal beam members, the end perimeter members extending laterally beyond the interior longitudinal beam members, and extending above the common plane, a pair of longitudinal perimeter members joined to ends of the end perimeter members to form with the end perimeter members a rectangular perimeter assembly, ledger members fixed to an inner surface of the longitudinal perimeter members, the ledger members having an upper surface lying in said common plane, a plurality of metal floor joists extending laterally between the longitudinal perimeter members, the metal floor joists having a lower surface lying in said common plane and an upper surface lying in a plane defined by upper surfaces of the end and longitudinal perimeter members, and U-shaped channel members enveloping the sides and lower surface of at least a portion of the interior longitudinal beam members, the channel members including laterally outwardly extending flanges.

10. An off-site factory built structure including a combined chassis and floor system comprising:

a pair of parallel interior longitudinal beam members having an upper surface defining a common plane, a pair of end perimeter members joined to ends of the interior longitudinal beam members, the end perimeter members extending laterally beyond the interior longitudinal beam members, and extending above the common plane, a pair of longitudinal perimeter members joined to ends of the end perimeter members to form with the end perimeter members a rectangular perimeter assembly, ledger members fixed to an inner surface of the longitudinal perimeter members, the ledger members having an upper surface lying in said common plane, floor joists extending laterally between the longitudinal perimeter members having a lower surface lying in said common plane and an upper surface lying in a plane defined by upper surfaces of the perimeter members, and a plurality of secondary stiffening members arranged parallel to the floor joists, the maximum spacing S, between the secondary stiffening members being related to their lateral extent W, by the equation:

$S\ 12-\frac{1}{2}W.$

11. The off-site factory built structure of claim 10 further comprising U-shaped channel members enveloping the sides and lower surface of at least a portion of the interior longitudinal beam members, the channel members including laterally outwardly extending flanges.

12. The off-site factory built structure of claim 11 further comprising a running gear mechanism coupled to the U-shaped channel members enveloping the interior longitudinal beam members near one end of the chassis.

13. The off-site factory built structure of claim 12 wherein the running gear mechanism comprises:

a pair of longitudinal support members spanned by a plurality of lateral support members that space the longitudinal support members by a distance about equal to the separation distance between the interior longitudinal beam members, and a plurality of axels, each axel being fixed to a pair of leaf springs, the leaf springs being located under and coupled to the longitudinal support members.

14. The off-site factory built structure of claim 11 further comprising a tow hitch coupled to the U-shaped channel members enveloping the interior longitudinal beam members near one end of the chassis.

15. The off-site factory built structure of claims 14 wherein the tow hitch comprises:

a lateral rear member underlying one of said secondary stiffening members, and two angled forwardly extending members coupled together with the lateral rear member to form an isosceles triangle, the length of the two angled forwardly extending members being sufficient to extend from the lateral rear member to a point outside the perimeter defined by one of said end perimeter members, the angled forwardly extending members being coupled to the U-shaped channel members enveloping the interior longitudinal beam members near one end of the chassis.

16. The off-site factory built structure of claim 10 further comprising sheeting fixed to said perimeter members and to said floor joists defining a top surface of the floor system, the sheeting including a panel that is designed for easy removal to permit ready access to any utility or mechanical elements placed below the top surface of the floor system, and a vapor retarder fixed to the perimeter members and the interior longitudinal beam members to enclose the floor system below the top surface.

17. The off-site factory built structure of claim 10 further comprising a perimeter wall constructed on top of the floor system including two longitudinal sidewalls having a top plate, each longitudinal sidewall including two vertical steel rods extending upward through the walls, each rod having a lower end fixed to one of said secondary stiffening members and an end emerging through the top plate of the perimeter wall.

18. The off-site factory built structure of claim 17 further comprising steel plates having a central opening fixed to a top surface of the top plate so that the upper end of each vertical steel rod emerges through one of the central openings.

19. The off-site factory built structure of claim 17 further comprising vertical compression members included in the perimeter wall and diagonal tension members having an upper end coupled to an upper end of one of the vertical compression members and a lower end coupled to one of said longitudinal perimeter members.

* * * * *

UNITED STATES PATENT AND TRADEMARK OFFICE
CERTIFICATE OF CORRECTION

PATENT NO. : 6,920,721 B2
DATED : July 26, 2005
INVENTOR(S) : Evor F. Johns et al.

It is certified that error appears in the above-identified patent and that said Letters Patent is hereby corrected as shown below:

<u>Column 14,</u>
Line 12, the word -- upper -- is inserted between the words "an" and "end".

Signed and Sealed this

Eighth Day of November, 2005

JON W. DUDAS
*Director of the United States Patent and Trademark Office*